United States Patent [19]

Saegusa

[11] Patent Number: 4,584,230
[45] Date of Patent: Apr. 22, 1986

[54] PROCESS FOR FABRICATING FOAM RESIN PANEL WITH INTEGRAL REINFORCEMENT

[75] Inventor: Nobuo Saegusa, Ebina, Japan

[73] Assignee: Nissan Motor Company, Limited, Yokohama, Japan

[21] Appl. No.: 752,718

[22] Filed: Jul. 8, 1985

[51] Int. Cl.$^4$ .............................................. B32B 5/14
[52] U.S. Cl. .................... 428/218; 264/45.1; 428/309.9; 428/310.5; 428/316.6
[58] Field of Search ............................ 264/45.1, 45.5; 428/218, 309.9, 310.5, 316.6

[56]  References Cited
U.S. PATENT DOCUMENTS

| | | | |
|---|---|---|---|
| 2,996,409 | 8/1961 | Lavely | 428/316.6 |
| 3,464,872 | 9/1969 | Everett | 428/309.9 |
| 3,520,769 | 7/1970 | Baker | 428/316.6 |
| 3,906,137 | 9/1975 | Bauer | 428/316.6 |
| 3,922,429 | 11/1975 | Welch et al. | 428/316.6 |
| 3,925,526 | 12/1975 | Haas | 264/45.5 |

FOREIGN PATENT DOCUMENTS 55-15138  1/1980  Japan .

Primary Examiner—William J. Van Balen
Attorney, Agent, or Firm—Schwartz, Jeffery, Schwaab, Mack, Blumenthal & Evans

[57] ABSTRACT

A foam resin panel is formed with one or more high-density reinforcing sections which are of higher density than the rest of the panel and which, therefore, are more stiff. The reinforcing section is densified by compression during fabrication. The reinforcing section is compressed until the outer faces of the reinforcing section lie flush to the panel surface. Fabrication of an invention foam resin panel includes a compression step for fabricating the high-density reinforcing section following a prefabricating step in which a resin precursor is induced to foam and expand to a desired extent within a mold. The resulting uniform foam resin element has a number of projections at the points at which the reinforcing sections of the finished panel will lie. The projections are then compressed into conformity with the rest of the panel and cured. The extent of the projections determines the density of finished reinforcing sections.

12 Claims, 9 Drawing Figures

PROCESS FOR FABRICATING FOAM RESIN PANEL WITH INTEGRAL REINFORCEMENT

BACKGROUND OF THE INVENTION

The present invention relates generally to a process for fabricating a reinforced foam resin panel or plate, the reinforcement being integral with the panel. More specifically, the invention relates to a process for fabricating a reinforced foam resin panel designed for use as a vehicular panel, such as a door inner trim, roof lining, instrument panel or the like.

Foam resin panels have been known and used in various applications. For example, since foam resin panels are soft and yielding, they are often used for door inner trim, roof lining, instrument panels and so forth in vehicles. On the other hand, foam resin panels are too soft alone to serve as the aforementioned vehicular body panels. Therefore, some sort of reinforment is needed to hold the panel in its original desired shape.

Conventionally, foam resin panels are reinforced by wire mesh applied to one side of the panel. This increases the weight and cost of the foam resin panel. As an alternative, reinforcing ribs may be formed integrally with the panel. In such cases, the reinforcing ribs protrude outward from the panel surface. This increases the overall thickness of the panel, which detracts from the space available to vehicle passengers.

SUMMARY OF THE INVENTION

Therefore, it is a principle object of the present invention to provide a reinforced foam resin panel which is light-weight and thin and requires no separate reinforcing material.

Another object of the invention to provide a process for fabricating a foam resin panel with reinforcements integral with the panel and lying flush with its surfaces.

A further object of the present invention is to provide a vehicular foam resin panel which helps reduce the overall weight of the vehicle and increases vehicular interior space.

In order to accomplish the aforementioned and other objects, a foam resin panel is formed with one or more high-density reinforcing sections which are of higher density than the rest of the panel and which, therefore, are more stiff. The reinforcing section is densified by compression during fabrication.

In the preferred embodiment, the reinforcing section is compressed until the outer faces of the reinforcing section lie flush to the panel surface.

Fabrication of an inventive foam resin panel includes a compression step for fabricating the high-density reinforcing section following a prefabrication step in which a resin precursor is induced to foam and expand to a desired extent within a mold. The resulting uniform foam resin element has a number of projections at the points at which the reinforcing sections of the finished panel will lie. The projections are then compressed into conformity with the rest of the panel and cured. The extent of the projections determines the density of finished reinforcing sections.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENTS

Figure 1:
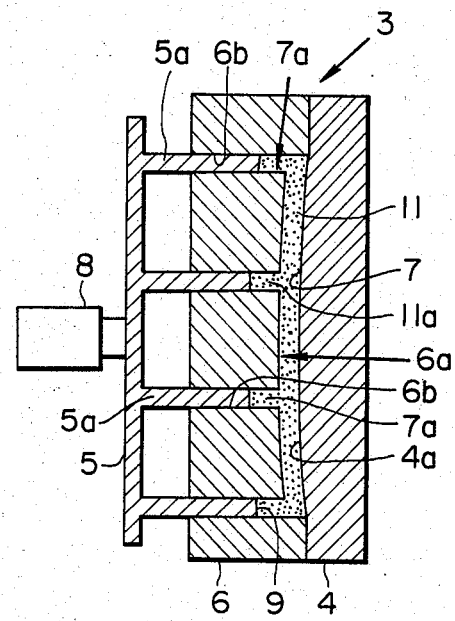
FIG. 1 is a cross-section through a mold during the prefabricating step of the preferred embodiment of fabrication process according to the invention.
Figure 2:
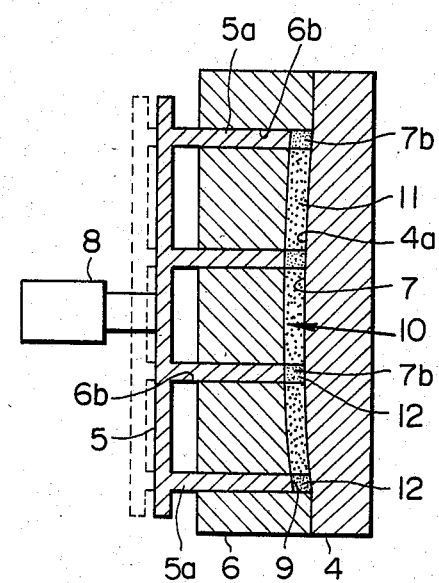
FIG. 2 is a view similar to FIG. 1 showing formation of the high-density reinforcing sections.
Figure 3:
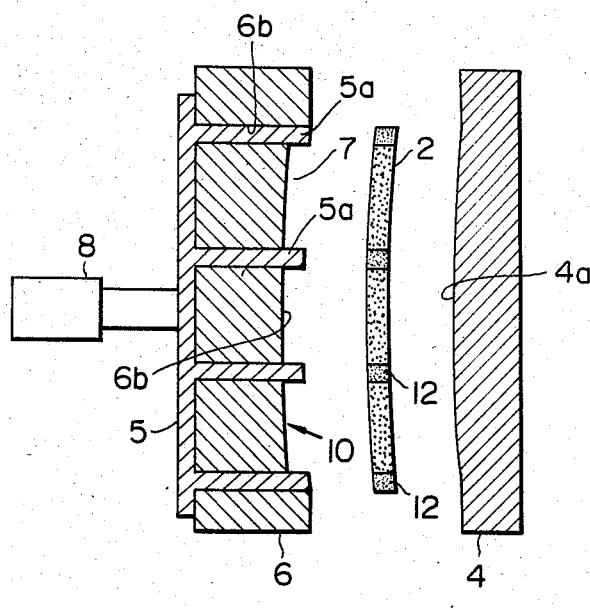
FIG. 3 is a view similar to FIG. 1 showing removal of the finished panel from the mold.

Referring now to the drawings, particularly to FIGS. 1 to 3, a mold 3 comprises an upper mold 4 and a lower mold 6. The lower mold 6 has a depression 6a defining a mold chamber 7 in conjunction with the upper mold 4. The surface 4a of the upper mold 4 and the floor of the depression 6a may be curved in the desired contours of the final product.

The lower mold 6 is formed with through openings 6b extending from the floor of the depression 6a to the outer surface 6c. A compression ram 5 with inserts 5a cooperates with the mold 3. The inserts 5a pass sealingly through the openings 6b and are free to slide toward and away from the mold chamber 7. The compression ram 5 is driven by an actuator 8 which comprises a hydraulic cylinder. Specifically, the actuator 8 drives the inserts 5a toward and away from the mold chamber 7.

Figure 4:
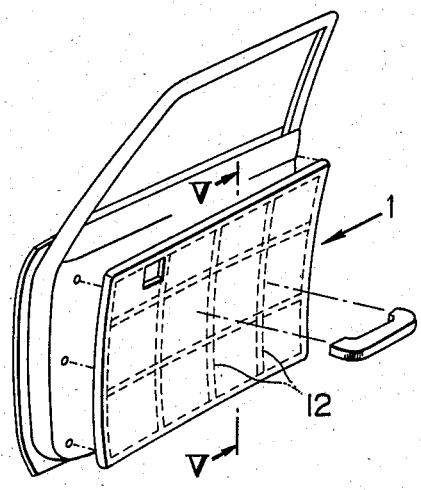
FIG. 4 shows one exemplary application of the foam resin panel in which the panel is used as a door inner trim.

The shown embodiment of the form process is designed to produce the door inner trim 1 shown in FIG. 4. As shown in FIG. 4, a foam resin panel 2 has a plurality of highly compressed, high-density reinforcing sections 12. The reinforcing sections 12 are arranged in a lattice pattern.

Returning to FIGS. 1 to 3, in order to form the reinforcing section grid 12, the openings 6b are formed in a lattice pattern matching the pattern of the reinforcing sections 12 in the finished panel. The inserts 5a of the compression ram 5 are of course also arranged in the lattice pattern matching the pattern of the openings 6b.

In practice first, granules of a foaming resin material are loaded into the mold chamber 7. Then, the material is heated by high temperature steam to induce foaming in a per se well-known matter. This heat treatment, causes the material to expand to a desired extent, preferably to approximately 10 times the volume of the original resin granule volume. The panel material can be selected from among conventional synthetic resins known to be suitable for such foaming processes, such as polyethylene, polystyrene or the like. In the shown example, polystyrene is used in the foam resin panel used as a door inner trim.

During this foaming step, the compression ram 5 with the inserts 5a are retracted to define spaces 7a in the openings 6b allowing formation of projecting sections 11a of the uniform foam resin element. At this stage, the foam resin panel is of essentially uniform density.

Upon completion of the foaming step but before the temperature of the foam resin drops below a given temperature, the actuator 8 become active to drive the compression ram 5 to the position shown in FIG. 2. At the position of FIG. 2, the inner ends of the inserts 5a lies flush with the floor of the depression 6a. As a result, the projecting sections 11a of the foam resin are compressed into conformity with the rest of the panel, thus fabricating high-density reinforcing sections 12 opposite the openings 6a. In the shown embodiment, the size of the projecting section 11a if designed so that the reinforcing sections 12 will be approximately twice as dense as the rest of the panel. Therefore, the reinforcing sections 12 will be stiffer than the rest of the panel and satisfactorily reinforce the finished foam resin panel.

After the above compression step, the panel is cooled down to a known temperature. After cooling, the upper and lower molds 4 and 6 are separated the finished panel 2 is removed.

Figure 5:
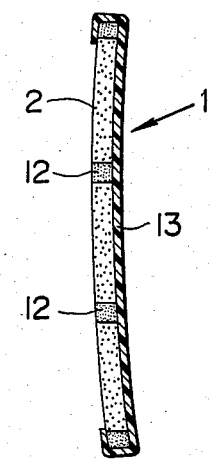
FIG. 5 is a cross-section taken along line V—V of FIG. 4.

As shown in FIG. 5, before use as a door inner trim, the foam resin panel 2 produced in the process described above is wrapped in an outer decorative layer 13. The outer layer 13 can be a sheet of vinyl chloride or of cloth.

The outer layer 13 can be applied after the panel is fabricated in the foregoing process. Alternatively, it is possible to lay the outer layer in the mold before starting the above fabricating process so as to adhere the outer layer to the one face of the finished panel during the fabricating process. The latter technique is disclosed in the Japanese Utility Model First Publicatipn No. 5-144176, published on Oct. 16, 1980. The contents of this Japanese Utility Model First Publication are hereby incorporated by reference for the sake of disclosure.

Figure 6:
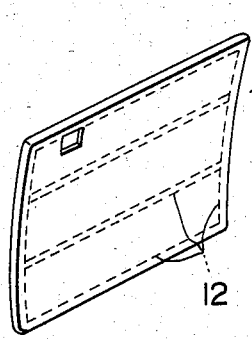
FIGS. 6 and 7 show variations of the foam resin panel serving as a door inner trim.
Figure 7:
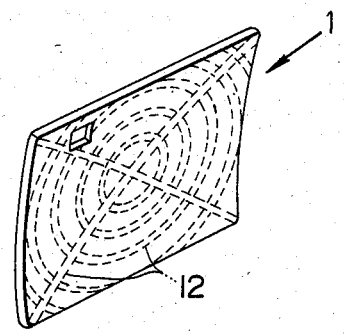

The pattern of the reinforcing sections 12 across the foam resin panel is not limited to the lattice pattern shown in FIG. 4. For instance, the patterns shown in FIGS. 6 and 7 may also be used. The spacing of the reinforcing sections 12 can be adjusted according to the desired strength of the panel. Furthermore, the stiffness of the reinforcing section can also be adjusted by varying the stroke of the inserts 5a of the compression ram 5.

Figure 8:
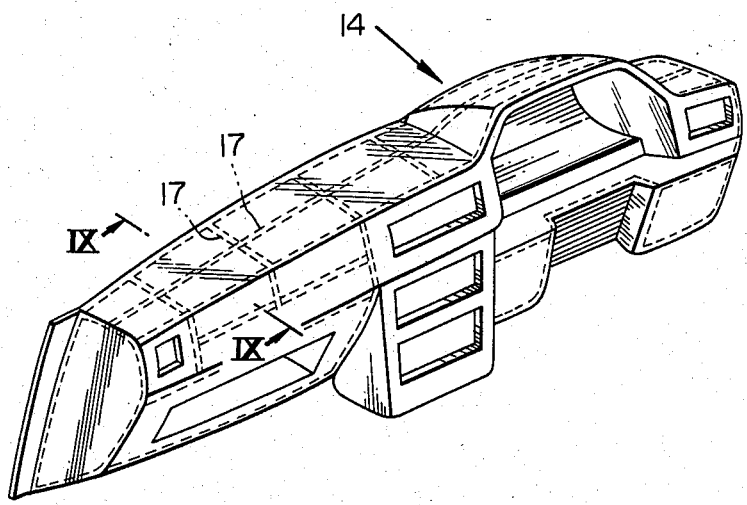
FIG. 8 is a perspective view of an instrument panel made from a foam resin panel according to the invention.
Figure 9:
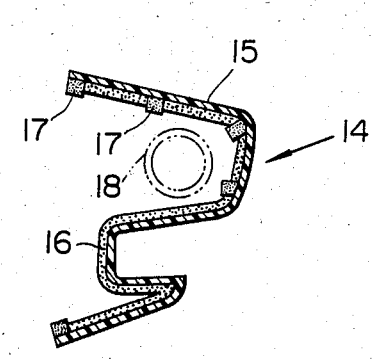
FIG. 9 is a cross-section taken along line IX—IX of FIG. 8.

Also, the foam resin panel thus produced by the shown embodiment is applicable not only as a door inner trim but also as various structural and decorative panels. FIGS. 8 and 9 show another application of the foam resin panel, in which the panel is used as a vehicular instrument panel 14. Because of the relatively complex shape of the desired final product, the outer decorative layer may be set in the mold prior to the fabrication process of the panel. In this case, the foam resin panel serves as the core 16 of the instrument panel. In order to ensure sufficient stiffness, the reinforcing sections project slightly from the panel surface in this embodiment. However, the reinforcing sections 17 are made so as not to protrude far enough to interfere with a ventilation duct 18 or the like installed within the instrument panel.

Therefore, the present invention fulfills all of the objects and advantages sought therefor.

While the present invention has been disclosed in detail in terms of the preferred embodiments of the invention, it should not be assumed to be limited to these specific embodiments. All possible embodiments and modifications to the shown embodiments which do not depart from the principle of the appended claims are to be regarded as being within the scope of the invention.

What is claimed is:

1. A foam resin panel comprising:
    a major section formed by foaming a resin material; and
    a reinforcing section integral with said major section and of the same material as said major section, said reinforcing section having a higher density that said major section and defining a predetermined pattern suitable for reinforcing the panel, and said reinforcing section being formed by compressing parts of a foam resin panel in said predetermied pattern.

2. The foam resin panel as set forth in claim 1, wherein said foaming process and said compressing process are carried out within a common cold.

3. The foam resin panel as set forth in claim 2, wherein the foam resin panel is used as a structural panel in an automotive vehicle.

4. The foam resin panel as set forth in claim 3, wherein said panel is used as a door inner trim with an outer layer fixed to one face thereof.

5. The foam resin panel as set forth in claim 3, wherein said panel is used as an instrument panel with an outer layer attached to one face thereof.

6. A process for fabricating a foam resin panel comprising steps of:
    providing a mold defining an internal space conforming to the shape of the desired panel, said space having extensions arranged in a predetermined pattern across one surface;
    loading a foaming resin material into said internal space;
    heating said material in said mold to induce foaming to predetermined extent by which the foam material fills said internal space and said extensions;
    compressing said foam material filling said extensions at least part way back into said internal space, thereby fabricating a high-density reinforcing section in said panel in said predetermined pattern;
    cooling the panel so formed within said mold; and
    removing the finished panel from said mold.

7. The process as set forth in claim 6, wherein said compression step is carried out immediately after completion of said foaming step.

8. The process as set forth in claim 7, which further comprises a step of sealing said extensions of said internal space of said mold by means of a ram movable between a first retracted position and a second compressing position, said ram normally being positioned at said first position and being driven into said second position during said compressing step.

9. The process as set forth in claim 8, wherein at said second position, the inner end of said ram lies flush with the peripheral wall of said internal space of said mold.

10. The process as set forth in claim 9, wherein said panel is a veahicle panel.

11. The process as set forth in claim 10, wherein said panel is a door inner trim.

12. The process as set forth in claim 8, wherein said panel is an instrument panel of an automotive vehicle.

* * * * *